US006263097B1

(12) United States Patent
Dewaele (10) Patent No.: US 6,263,097 B1
(45) Date of Patent: Jul. 17, 2001

(54) METHOD OF DETERMINING (A) SYMMETRY LINE(S) IN A RADIATION IMAGE

(75) Inventor: Piet Dewaele, Berchem (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/103,991

(22) Filed: Jun. 24, 1998

Related U.S. Application Data (60) Provisional application No. 60/058,274, filed on Sep. 9, 1997.

(30) Foreign Application Priority Data

Jul. 4, 1997 (EP) .................................................. 97202033

(51) Int. Cl.[7] ....................................................... G06K 9/00
(52) U.S. Cl. ............................ 382/132; 382/217; 250/334
(58) Field of Search ..................................... 382/132, 174, 382/288, 289, 203, 217; 345/441, 440; 356/336; 362/347; 250/334

(56) References Cited

U.S. PATENT DOCUMENTS

| | | | |
|---|---|---|---|
| 4,720,870 | 1/1988 | Billiotte | 382/145 |
| 4,951,201 | 8/1990 | Tanka | 382/128 |
| 5,421,331 | 6/1995 | Devito | 600/425 |
| 5,502,561 * | 3/1996 | Hutchins et al. | 356/336 |
| 5,533,143 | 7/1996 | Takeo | 382/132 |
| 5,790,700 * | 8/1998 | Saito | 382/203 |
| 5,818,458 * | 10/1998 | Sito | 345/441 |
| 5,877,774 * | 3/1999 | Saito | 345/440 |
| 6,019,485 * | 2/2000 | Winston et al. | 362/347 |

OTHER PUBLICATIONS

"Symmetry–Based Recognition of Vechicle Rears" by A. Kuehnle; Pattern Recognition Letters, vol. 12, No. 4, Apr. 1, 1991. pp. 249–258, XP000206854.

* cited by examiner

*Primary Examiner*—Joseph Mancuso
*Assistant Examiner*—A Tabatabai
(74) *Attorney, Agent, or Firm*—Baker Botts L.L.P.

(57) ABSTRACT

Method of determining (a) symmetry line(s) in a radiation image.

A method of determining (a) symmetry line(s) in horizontal (vertical) direction in an image that is represented by a matrix of digital pixel values by (i) calculating a symmetry point for each column (row) of the image, and (ii) interconnecting calculated symmetry points.

16 Claims, 4 Drawing Sheets

METHOD OF DETERMINING (A) SYMMETRY LINE(S) IN A RADIATION IMAGE

The application claims the benefit of U.S. Provisional Application No. 60/058,274 filed Sep. 9, 1997.

FIELD OF THE INVENTION

The invention relates to an image processing method to find the symmetry line and orientation angle of a radiation image, such as a medical radiation image.

BACKGROUND OF THE INVENTION

One of the basic properties of shapes and objects is symmetry. The human body shows symmetry along an axis oriented from top to bottom.

Medical images originating from image acquisition modalities such as computed projection radiography show symmetry to a large extent for examination types of body parts which are essentially symmetric. Examples of such examination types are e.g. frontal skull, frontal spine, frontal thorax, frontal abdomen, frontal pelvis.

In U.S. Pat. No. 5,533,143 a method is disclosed for determining whether an image is symmetric or asymmetric. Image processing conditions are based on the judgment that the image is a frontal (symmetric) object image or a lateral (asymmetric) image.

The disclosed method is based on the assumption that the hypothetical symmetry axis is always fixed and coincides with a vertical center line passing through the center of the image. The method does not discriminate between vertical or horizontal symmetry.

By studying a large mixture of all symmetric examination types, it is observed that (1) the symmetry line in most cases does not coincide with the center line of the image, nor is its angle with respect to a perfectly vertical (or perfectly horizontal) line equal to zero and (2) horizontal symmetry occurs equally well as vertical symmetry.

The above-mentioned observations limit the accuracy and applicability of the prior art method disclosed in the above-mentioned patent.

In U.S. Pat. No. 4,903,310 and U.S. Pat. No. 4,951,201 various histogram based methods are proposed to discriminate between a frontal and a lateral body posture.

It is however not possible to decide by applying these methods whether the object is symmetrical and whether the object is positioned horizontally or vertically.

The above methods are thus not adequate.

Experience has learnt that radiologists prefer to examine radiographic images in standard viewing conditions, i.e. with the image displayed so that a symmetry axis in the image is substantially horizontally or vertically oriented.

OBJECT OF THE INVENTION

It is an object of the invention to provide a method of determining a symmetry line of a radiation image.

It is a further object of the invention to provide a method of determining an orientation angle associated with such a symmetry line.

It is still a further object to provide a method by means of which images can be provided having a symmetry axis directed in a predetermined orientation.

Further objects of the present will become apparent from the description hereafter.

SUMMARY OF THE INVENTION

The objects of the present invention are achieved by a method of determining a symmetry line in a radiation image represented by a raster of pixel values comprising the steps of (i) calculating a symmetry point for each column (row) of said image, (ii) interconnecting symmetry points calculated for each column (row).

The way in which (a) symmetry point(s) is calculated, is described further on.

The method of the present invention can be applied to a digital signal representation of a radiation image such as a medical X-ray image. But it can also be applied to other kinds of radiation images such as images originating from non-destructive testing (NDT) of objects by irradiation of these objects.

Collimation and direct exposure areas in the image need to be excluded from consideration since they are not necessarily present in the image in a symmetrical way. In European patent application 97201683.6 an ensemble of methods is disclosed to perform a raw segmentation of a radiation image into collimation areas (foreground), direct exposure areas (background) and diagnostic areas (body parts).

The method of the present invention can also be applied to each of the sub-images of a multiply exposed image.

The method of the present invention permits to compute a symmetry index for a horizontal and vertical direction in the image, and to classify the image as either horizontally or vertically oriented based on the horizontal and vertical symmetry index referred to further on.

The matrix of pixel values representing a radiation image can be obtained by means of a wide variety of image acquisition techniques.

In one example of an image acquisition technique, a radiation image which is temporarily stored in a photostimulable phosphor screen is read out by scanning the screen with stimulating radiation, detecting light emitted by the screen upon radiation and converting detected light into a digital signal representation.

However, other acquisition techniques may be envisaged.

BRIEF DESCRIPTION OF THE DRAWINGS

Further details of the present invention as well as preferred embodiments hereof will be explained hereafter with reference to the drawings in which FIG. 1 shows a thorax image in the presence of collimation areas and direct exposure areas. The automatically computed vertical symmetry axis is superimposed.

FIG. 2 shows the fitted symmetry axis of the thorax image.

FIG. 3 shows a pelvis image in the presence of collimation areas and direct exposure areas. The automatically computed horizontal symmetry axis is superimposed.

FIG. 4 shows the fitted symmetry axis of the pelvis image.

DETAILED DESCRIPTION

Computation of the Symmetry Line

Figure 1:
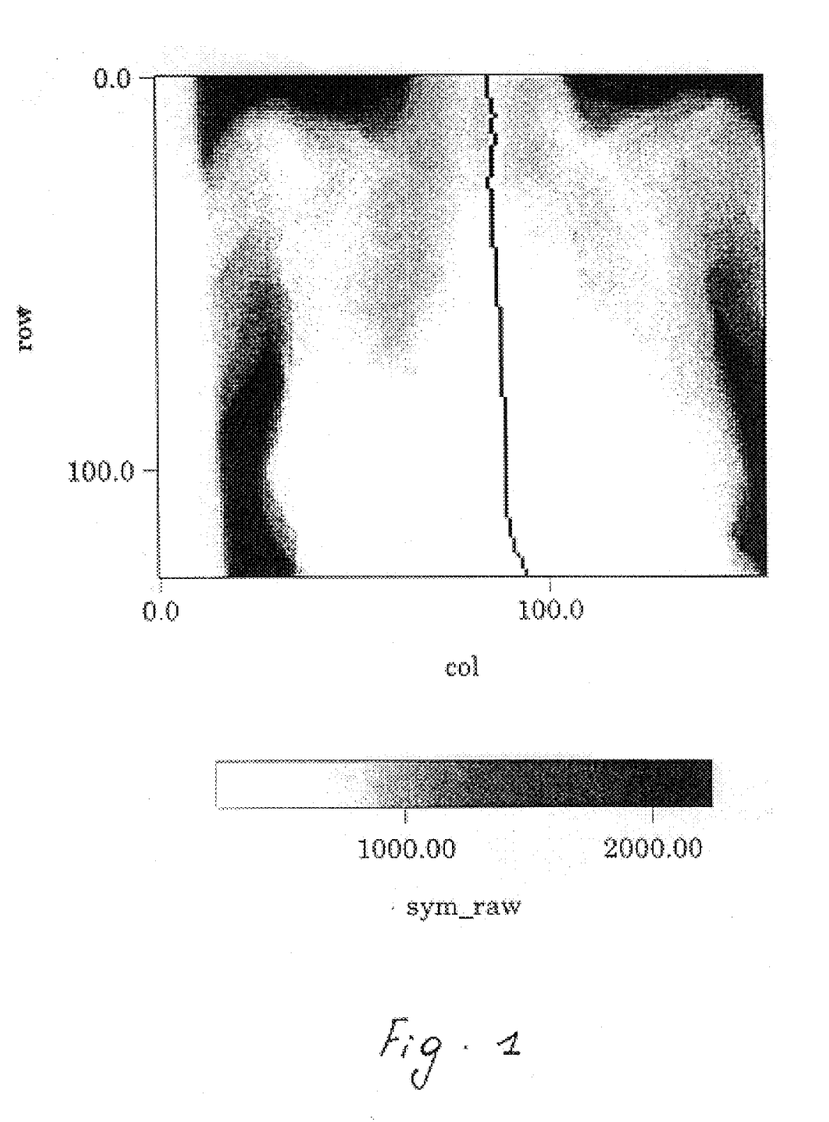
Figure 2:
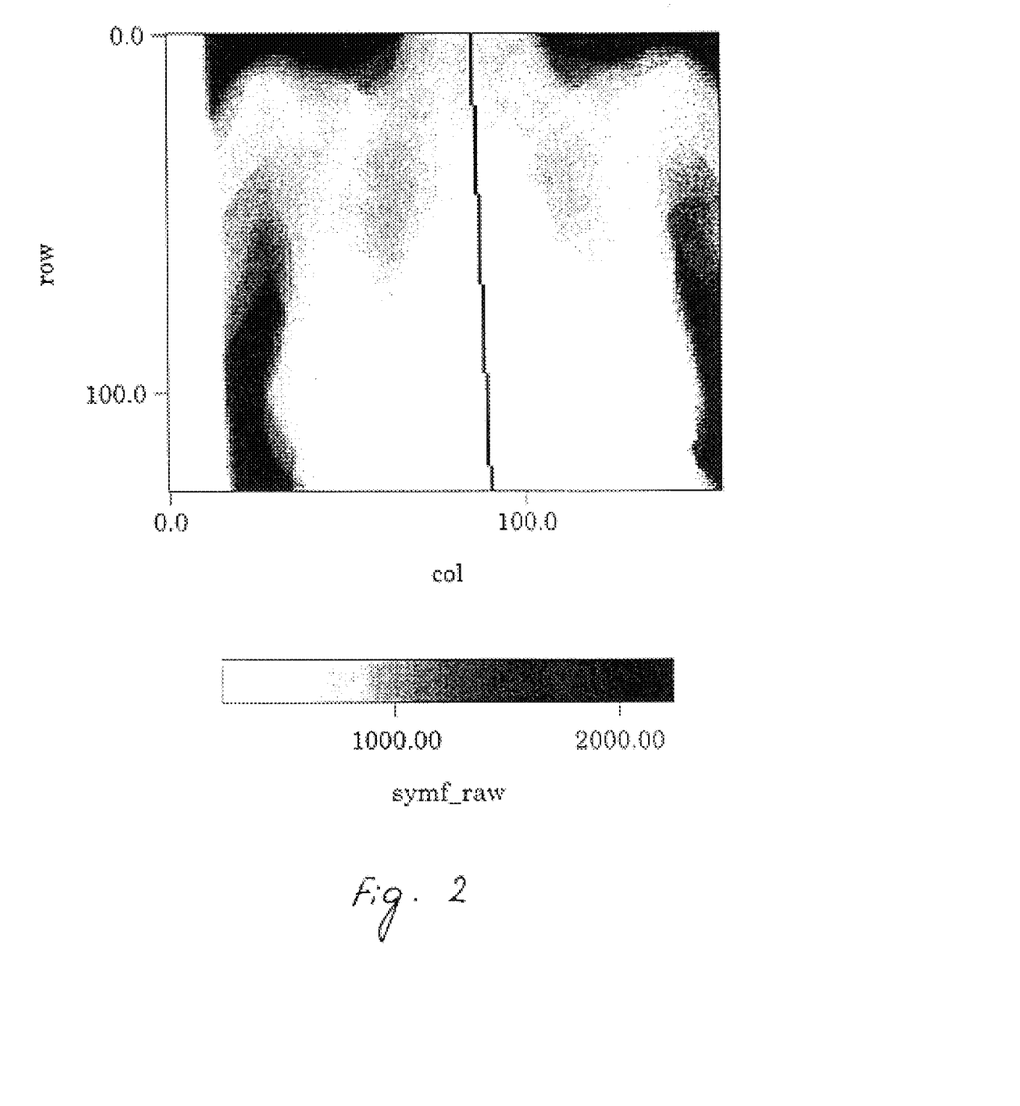
Figure 3:
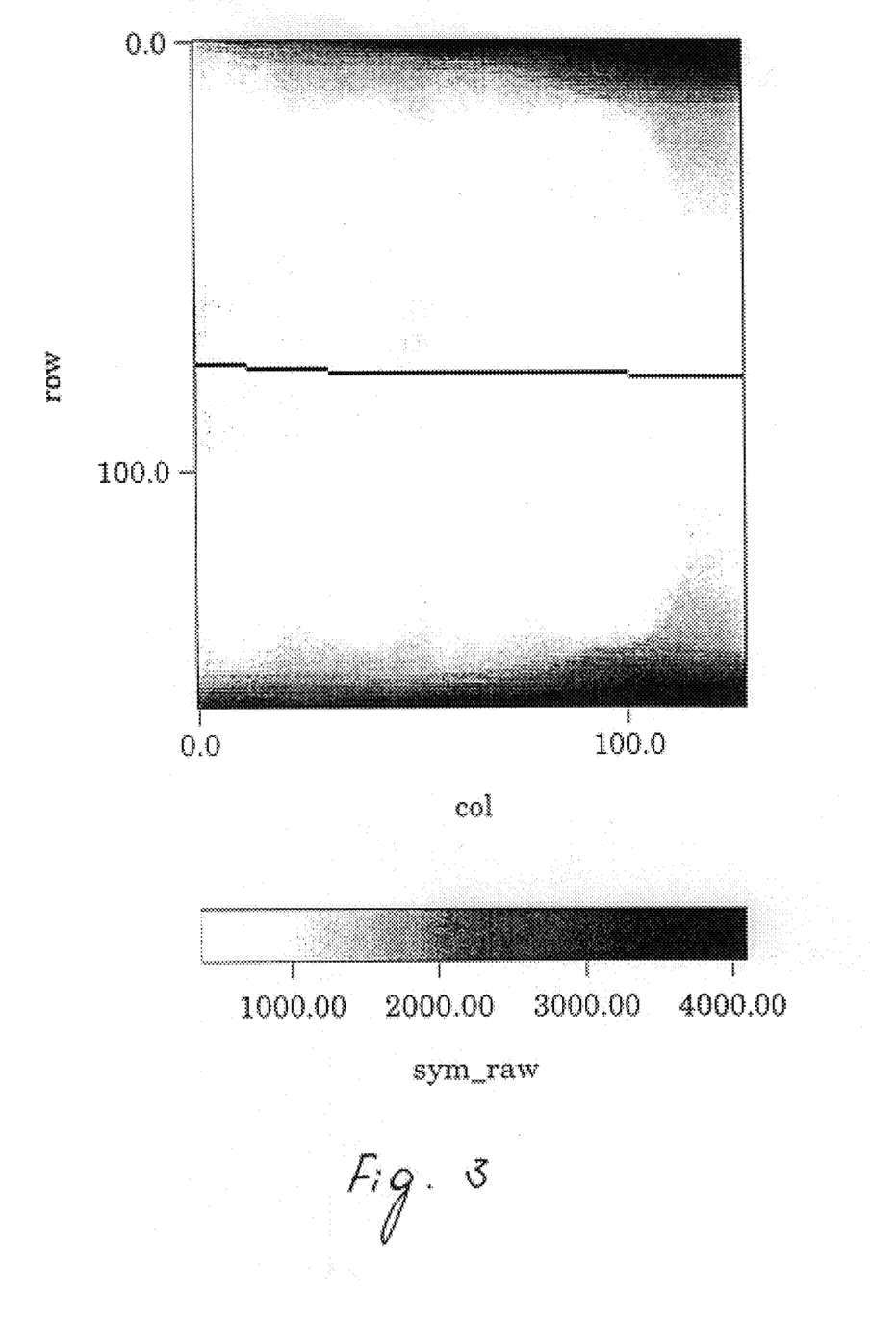
Figure 4:
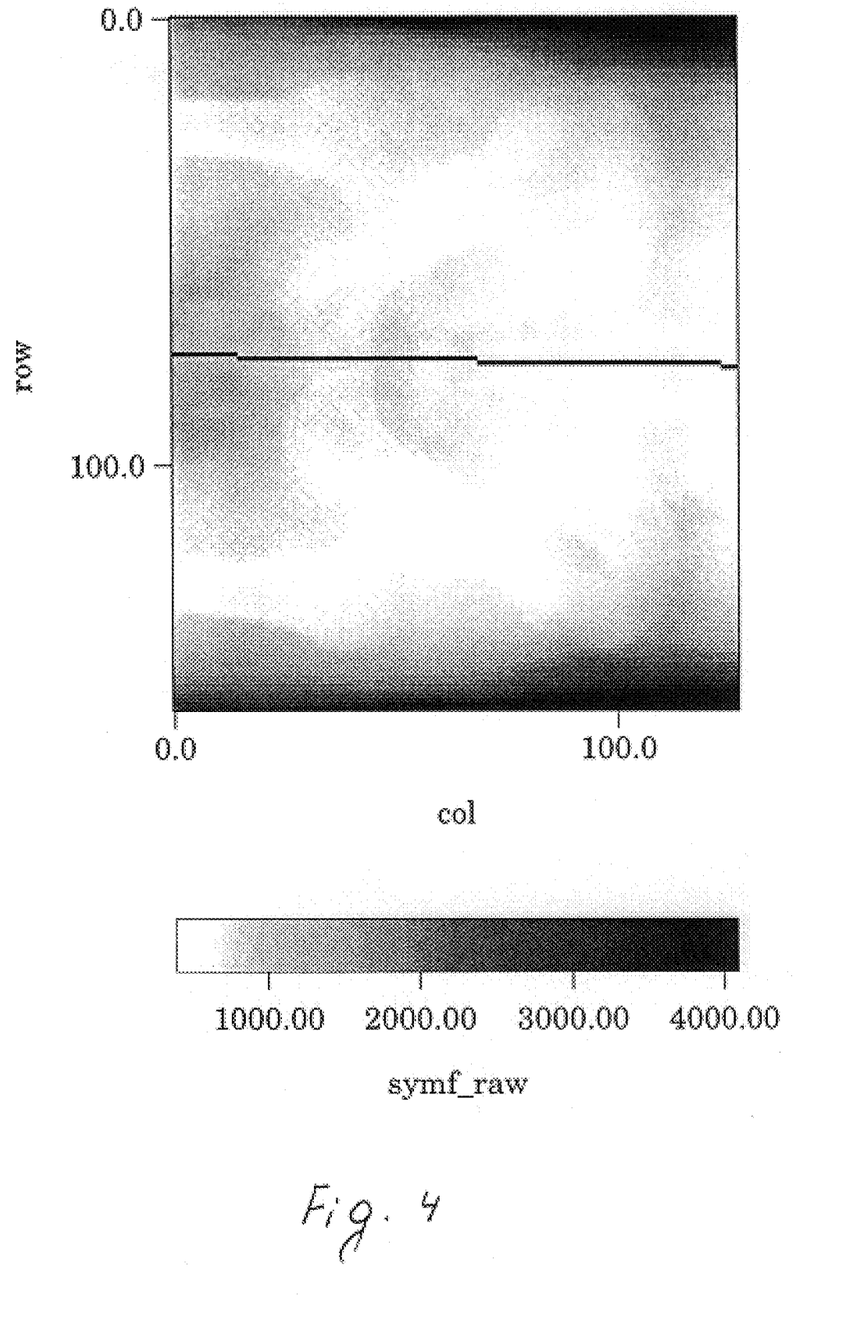

The method of the present invention is described in the following for application to the columns j of an image. An analogous description applies to rows i.

Given an image represented by a raster of M×N pixel values $g(i,j)$ with M rows ranging from $(0, \ldots, M-1)$ and N columns ranging from $(0, \ldots, N-1)$, and with larger gray values g representing less exposed image pixels.

A symmetry measure is computed for each pixel on row i, assuming that the pixel be the most symmetrical point on the line.

The basic consideration is that, in the assumption that the central pixel be the symmetry point for the interval of which it is the center, the gray values at symmetrical positions at either side of the symmetry point will nearly be equal, hence their difference will nearly be zero.

The symmetry measure can thus be expressed as a sum S of squared or absolute differences of gray values taken symmetrically around a hypothesized symmetry center c:

$$S(i=c, j) = \sum_{k=1}^{m(i)} [g(c+k, j) - g(c-k, j)]^2$$

$$c = T, \ldots, M - T - 1$$

in which $g(i,j)$ denotes the gray value at row i and column j, c is the row index of the current hypothesized symmetry center, and T is an offset parameter denoting the number of pixels to skip at the start of the column resp. to omit at the end of the column.

In the start and end interval T, it is assumed that too few points are available to compute S reliably.

The measure S will be minimal for the most symmetrical point in the column j. The parameter m denotes the maximum number of difference terms at row location c and is given by $$m(i) = \min(i, M-i-1)$$

Each sum for a row index i needs proper normalization in order to make correct comparisons possible. A straightforward normalization is to divide S by the number of terms m involved in its computation:

$$\overline{S}_1(c, j) = \frac{S(c, j)}{m} \quad c = T, \ldots, M - T - 1$$

A further refinement takes into account particularities of geometry and exposure level of the examination. It has been observed that (1) the symmetry line has higher probability to lie nearby the center of the (sub-)image than nearby the borders of the image, and (2) the symmetry line runs through more exposed body parts.

Therefore, the refined normalization first takes the number m of terms into account, and second the gray value of the hypothesized center c itself:

$$\overline{S}_2(c, j) = \frac{S(c, j)}{g^u(c, j) \cdot m^v} \quad c = T, \ldots, M - T - 1.$$

In the context of the present invention, u=2 and v=3. The use of exponents larger than 1 has been found to have a stabilizing effect on the location of symmetry points for subsequent rows. Clearly, the measure $\overline{S}_2$ favours potential symmetry centers having sufficiently large gray value g, that is, being more attenuated, and which have more number of terms m involved in their computation. Intuitively stated, symmetry lines nearby the image center line (but not necessarily coinciding with it) and more attenuating body parts such as bone are better candidates for being the actual symmetry line than any other lines. Examination types such as thorax, spine and skull all adhere to these underlying assumptions. In the sequel, it is assumed that the refined normalization is used, i.e. $\overline{S} = \overline{S}_2$.

Finally, the symmetry center $C_h(j)$ of column j is assigned to row c for which $\overline{S}(c,j)$ is minimal:

$$C_h(j) = \min(\overline{S}(c,j), c=T, \ldots, M-T-1)$$

The sequence $$C_h(j) \ j=0, \ldots, N-1$$

is defined as the horizontal symmetry line of the image.

An analog description holds for deriving a vertical symmetry line $C_v(i)$. Similarly, a diagonal symmetry line can be derived for objects having a principal axis along the main diagonal or secondary diagonal of the image.

In general, for linear symmetry of two-dimensional objects, i.e. symmetry expressed by a symmetry line running along a one-dimensional curve, at any point along the symmetry curve, the difference accumulation measure $\overline{S}$ reaches a minimum along a line locally perpendicular to the symmetry curve.

Hence, for symmetry lines slightly oblique with respect to the perfectly horizontal resp. vertical direction, the method presented here yields an approximation to the ideal algorithm in which the measure $\overline{S}$ is computed along several trajectories through the hypothesized symmetry center, one trajectory of which is perpendicular to the yet unknown symmetry curve and thus having the smaller value of $\overline{S}$ associated with it.

The computation of a symmetry point becomes unreliable when the gray value profile is constant. Indeed, according to definition $S_1$ of the normalized sum, every point along a constant profile is an equally potential symmetry center since the symmetry measure is constant zero everywhere. According to definition $S_2$, the center point of the line will a priori be symmetry point. Therefore, a quality measure is needed to express the reliability of the symmetry point. Obviously, when the line shows a large degree of signal energy variation, the most symmetrical point is also considered more reliable since, despite the variability of gray value data, all difference terms around the true symmetry center amount to a small value. The inverse of the standard deviation of data around the gray value of the hypothesized symmetry center is therefore a good candidate to measure the reliability of the hypothesized symmetry center. This reliability measure can thus be expressed as $$R(c, j) = 1 - \frac{1}{\sqrt{\sigma^2(c, j) + 1}}$$

with $$\sigma^2(c, j) = \frac{1}{m}\left(\sum_{k=1}^{m}[g(c-k, j) - g(c, j)]^2 + \sum_{k=1}^{m}[g(c+k, j) - g(c, j)]^2\right).$$

The additive term 1 in the denominator avoids zero division for perfectly flat gray value profiles. obviously, $0 < R(c,j) \leq 1$. The associated sequence of reliability measures for each of the mos t symmetrical points in a column j is defined as $$R_h(j) = R(i=C_h(j),j) \ j=0, \ldots, N-1$$

The computations of $\overline{S}(c,j)$ and $R(c,j)$ are further refined in two ways:

points (c,j) belonging to either the collimation area or direct exposure area are excluded from consideration since potential symmetry points must lie in diagnostic areas. The availability of the collimation areas and direct exposure areas as bitmap images is segmented on the original x-ray as disclosed in European patent application 97201683.6. These points are disregarded by putting $\overline{S}(c,j)$ and $R(c,j)$ to their corresponding extreme values $\overline{S}(c,j)$=LARGE_FLOAT and $R(c,j)$=0.0 terms in the sums of $\overline{S}(c,j)$ and $R(c,j)$ are disregarded whenever they exceed an upper limit on the difference value. This threshold is empirically determined as a fraction of the full scale range L:

$T_{diff}$=L/4

This has the effect of ignoring large valued terms due to gray values belonging to direct exposure areas.

At this point it is clear that the concept of minimizing sums of difference values along trajectories perpendicular to the symmetry line searched for and running through the hypothesized symmetry center is applicable for other kinds of symmetry as well.

Rotational symmetry, in which a two-dimensional object shows symmetry around its center point (mostly coinciding with the object's center), can be detected by finding the point at which the sum of difference values between points lying symmetrically at either side of a hypothesized symmetry center, is minimal. An alternate form of rotational symmetry is presented by the N-degree rotational symmetry in which an object is identical to its rotation by N degrees around its symmetry center. Here, differences between rotated points are accumulated and minimized.

Rotational symmetry frequently occurs in radiation images of man-made objects such as rings, wheels, gears etc.

Fitting a Polynomial to the Symmetry Line

The symmetry line computation is completed by idealizing the empirically found sequence $C_h(j)$ or $C_v(i)$ to a polynomial equation. For most examination types (such as thorax, pelvis, skull, abdomen), the symmetry line is a straight line. The regression model is the well-known linear combination of 1 and x (namely a+bx). More general, the model solved for can be a linear combination of any K specified functions of x. Here x stands for the running abscissa coordinate along rows i for the vertical symmetry axis fitting or columns j for the horizontal symmetry axis fitting. Prior art such as described in "W. H. Press, Numerical Recipes in C, The art of scientific computing, Cambridge University Press, 1st ed. 1988, Chapter 14, Modeling of Data" is used to solve a general linear least squares fitting or regression. For example, the functions could be $1, x, x^2, \ldots, x^{K-1}$, in which case the general linear combination $y(x) = a_1 + a_2 x + a_3 x^2 + \ldots a_K x^{K-1}$ is a polynomial of degree K-1. The general form of this kind of model is $$y(x) = \sum_{k=1}^{K} a_k X_k(x)$$

where $X_1(x), \ldots, X_K(x)$ are arbitrary fixed functions of x, called the basis functions. The $X_k(x)$ can be nonlinear functions of x. The term linear only refers to the model's linear dependence on the parameters $a_k$. As best parameters $a_k$, those that minimize the chi-square figure of merit are computed $$\chi^2 = \sum_{j=1}^{N} \left[ \frac{C_h(j) - \sum_{k=1}^{K} a_k X_k(j)}{1 - R_h(j)} \right]^2,$$

where the notation is given for the horizontal symmetry line, with $C_h(j)$ the location in each column j of the most symmetrical point and $1-R_h(j)$ its associated measurement error. The influence on the fitting result of the incorporation of measurement errors is such that unreliable symmetry centers will be taken less into account. Hence, the fit result will have the effect to only 'follow' reliable data points, and 'ignore' the others. This property is particular advantageous for examination types having portions of relatively flat gray value regions where it is difficult to assign a true symmetry center. The symmetry center points of those regions are disregarded in the computation and do not influence the correct symmetry line.

Standardization of Image Viewing Conditions

The most symmetrical orientation, either horizontally or vertically, can be derived on the basis of the sequence of symmetry measures $S_h(j)$ j=0, ..., N-1
$S_v(i)$ i=0, ..., M-1 by computing their associated symmetry index $$SI_h = \frac{1}{N} \sum_{j=0}^{N-1} S_h(j)$$

resp.

$$SI_v = \frac{1}{M} \sum_{i=0}^{M-1} S_v(i)$$

and taking the smaller of the two as the symmetry index and associated main orientation of the image, i.e.

SI=min($SI_h$,$SI_v$)

The orientation angle α is derived from the symmetry line and the image is rotated by an angle -α to make the orientation coincide with the perfectly horizontal or perfectly vertical orientation depending on the applicable case. Prior art is used to rotate a digital image artifact-free over a given angle, such as described in "G. Wolberg, Digital Image Warping, IEEE Computer Society Press Monograph, 1990, Chapter 7.3. Rotation". The rotated image is subsequently sent to a soft-copy or hard-copy device for display, review or diagnosis.

Stepwise Summary of Operations

A stepwise description of operations for performing the image standardization algorithm is given in the sequel.

Step 1: for each sub-image of a possibly partitioned image
Step 2: for each column j
Step 3: for each pixel c at position i in column j, T≦c≦M-T-1, excluding pixels in collimation areas or direct exposure areas
Step 4: Compute
the maximum range for the subsequent sums m=min(i,M-i-1)

the symmetrical difference sums around hypothesized symmetry center c $$S(i=c, j) = \sum_{k=1}^{m} [g(c+k, j) - g(c-k, j)]^2$$

the normalized symmetry measure $$\overline{S}(c, j) = \frac{S(c, j)}{g^u(c, j) \cdot m^v}$$

the associated reliability measure $$R(c, j) = 1 - \frac{1}{\sqrt{\sigma^2(c, j) + 1}}$$

Step 2': repeat for the next pixel in the column
Step 4: From the sequences of symmetry measure and associated reliability measure
find the most symmetric point in the column $$C_h(j) = \min(\overline{S}(c, j), c = T, \ldots, M-T-1)$$

find the associated reliability $$R_h(j) = R(i = C_h(j), j)$$

Step 3': repeat for the next column j+1
Step 5: Form the sequences of symmetry centers and associated reliability measure for all columns
$C_h(j)$ j=0, ..., N-1
$R_h(j)$ j=0, ..., N-1
Step 6: Compute the linear least squares fitting on the data tuples (j,$C_j$(j)) and associated measurement error 1-$R_h$(j) to find the horizontal symmetry line $SL_h$ of the examination body part.
Step 7: Compute the symmetry index $SI_h$ corresponding to the horizontal symmetry line
Step 8: Repeat steps 3 through 7 to obtain the vertical symmetry line $SL_v$ and associated symmetry index $SI_v$.
Step 9: Retain the smaller of the symmetry indexes ($SI_h$,$SI_v$) for the horizontal and vertical hypothesized symmetry lines ($SL_h$,$SL_v$) as the final image's main symmetry line SL and associated symmetry index SI.
Step 10: Derive the orientation α of the retained symmetry line SL.
Step 11: Rotate the image over an angle −α to its standard viewing position.
Step 1': Repeat steps 2 through 11 for each sub-image of a possibly multiply exposed image

What is claimed is:

1. Method of determining a symmetry line in at least one of a horizontal direction and a vertical direction in a radiation image that is represented by a matrix of digital pixel values, comprising the steps of:
   (i) calculating, in case of horizontal directions a symmetry point for each column of the image, and, in case of vertical direction, a symmetry point for each row of said image; and
   (ii) interconnecting calculated symmetry points,
      wherein a symmetry point for column j or row j, respectively, is obtained by:
         (1) calculating for column j or row j, and for each pixel c at position i in column j or row j, symmetrical difference sum values S according to the formula:

$$S(i=c, j) = \sum_{k=1}^{m(i)} [g(c+k, j) - (g(c-k, j)]^2,$$

where c=T, ..., M−T−1, g(i,j) is a gray value at position (i,j), T is an offset parameter, M is a number of rows or columns, respectively in the matrix, and m(i) equals to min (i, M−i−1),
         (2) normalizing S to obtain $\overline{S}$, and
         (3) determining a minimal value $\overline{S}_{min}$ of the values $\overline{S}$ obtained for each pixel c, and denoting a value c for which $\overline{S}$ is equal to $\overline{S}_{min}$ as the symmetry point of column j or row j, respectively.

2. Method according to claim 1 wherein $$\overline{S}(c, j) = \frac{S(c, j)}{m(i)} \quad c = T, \ldots, M-T-1.$$

3. Method according to claim 1 wherein $$\overline{S}(c, j) = \frac{S(c, j)}{g^u(c, j) \cdot (m(i))^v}$$

$c = T, \ldots, M-T-1$ and wherein $u, v \geq 1$.

4. Method according to claim 1 wherein symmetry points are interconnected to obtain a symmetry line by computing the least squares fitting on data tuples (j,$C_j$(j)) and an associated measurement error value (1−R(j)), wherein R(j) is a reliability measure for each of the symmetry points.

5. Method according to claim 1 wherein a horizontal symmetry index ($SI_h$) is calculated as $$SI_h = \frac{1}{N} \sum_{j=0}^{N-1} S_h(j),$$

and a vertical symmetry index ($SI_v$) is calculated as $$SI_v = \frac{1}{M} \sum_{j=0}^{M-1} S_v(i),$$

wherein a main orientation index (SI) of the image is determined as $$SI = \min(SI_h, Si_v),$$

and wherein a symmetry line with an associated symmetry index that is equal to SI determines a direction of orientation of the image.

6. Method according to claim 1 wherein an orientation angle of an image is determined as an angle between a horizontal or vertical symmetry line respectively and a horizontal or vertical coordinate axis.

7. Method of determining a symmetry line in at least one of a horizontal direction and a vertical direction in a radiation image that is represented by a matrix of digital pixel values, comprising the steps of:
   (i) calculating, in case of horizontal direction, a symmetry point for each column of the image, and, in case of vertical direction, a symmetry point for each row of the image;

(ii) interconnecting calculated symmetry points; and
(iii) computing a reliability measure R(c, j) associated with a calculated symmetry point c for column j or row j, respectively, according to:

$$R(c, j) = 1 - \frac{1}{\sqrt{\sigma^2(c, j) + 1}},$$

where $$\sigma^2(c, j) = \frac{1}{m}\left(\sum_{k=1}^{m}[g(c-k, j) - g(c, j)]^2 + \sum_{k=1}^{m}[g(c+k, j) - g(c, j)]^2\right).$$

8. Method according to claim 7 wherein a horizontal symmetry index ($SI_h$) is calculated as $$SI_h = \frac{1}{N}\sum_{j=0}^{N-1} S_h(j),$$

and a vertical symmetry index ($SI_v$) is calculated as $$SI_v = \frac{1}{M}\sum_{j=0}^{M-1} S_v(i),$$

wherein a main orientation index SI of the image is determined as $$SI = \min(SI_h, SI_v),$$

and wherein a symmetry line with an associated symmetry index that is equal to SI determines a direction of orientation of the image.

9. Method according to claim 7 wherein an orientation angle of the image is determined as an angle between a horizontal coordinate axis and a vertical coordinate axis.

10. Method of providing a radiation image in a position in which a horizontal or vertical symmetry line respectively in said image is parallel to a horizontal or vertical coordinate axis comprising the steps of
(i) determining a horizontal or vertical symmetry line in said image,
(ii) determining an orientation angle α by which said image is tilted relative to a horizontal or vertical coordinate axis respectively,
(iii) rotating said image by an angle −α.

11. Method according to claim 10 wherein the respective symmetry line is calculated by:
(i) calculating, in case of horizontal direction, a symmetry point for each column of the image, and, in case of vertical direction, a symmetry point for each row of said image; and
(ii) interconnecting calculated symmetry points, wherein a symmetry point for column j or row j, respectively, is obtained by:
(1) calculating for column j or row j, and for each pixel c at position i in column j or row j, symmetrical difference sum values S according to the formula:

$$S(i = c, j) = \sum_{k=1}^{m(i)}[g(c+k, j) - (g(c-k, j)]^2,$$

where c=T, . . . , M−T−1, g(i, j) is a gray value at position (i, j), T is an offset parameter, M is a number of rows or columns, respectively in the matrix, and m(i) equals to min (i, M−i−1),
(2) normalizing S to obtain $\overline{S}$, and
(3) determining a minimal value $\overline{S}_{min}$ of the values $\overline{S}$ obtained for each pixel c, and denoting a value c for which $\overline{S}$ is equal to $\overline{S}_{min}$ as the symmetry point of column j or row j, respectively.

12. Method according to claim 10, wherein the respective symmetry line is determined by:
(i) calculating, in case of horizontal direction, a symmetry point for each column of the image, and, in case of vertical direction, a symmetry point for each row of the image;
(ii) computing a reliability measure R(c, j) associated with a calculated symmetry point c for column j or row j, respectively, according to:

$$R(c, j) = 1 - \frac{1}{\sqrt{\sigma^2(c, j) + 1}},$$

where $$\sigma^2(c, j) = \frac{1}{m}\left(\sum_{k=1}^{m}[g(c-k, j) - g(c, j)]^2 + \sum_{k=1}^{m}[g(c+k, j) - g(c, j)]^2\right); \text{ and}$$

(iii) interconnecting symmetry point to obtain a symmetry line by computing the least squares fitting on data tuples (j,$C_j$(j)) and associated measurement error value (1−R(j)), wherein R(j) is a reliability measure for each of the symmetry points.

13. Method of determining a symmetry line in at least one of a horizontal direction and a vertical direction in a radiation image that is represented by a matrix of digital pixel values, comprising the steps of:
(i) calculating, in case of horizontal direction, a symmetry point for each column of the image, and, in case of vertical direction, a symmetry point for each row of the image;
(ii) computing a reliability measure R(c, j) associated with a calculated symmetry point c for column j or row j, respectively, according to:

$$R(c, j) = 1 - \frac{1}{\sqrt{\sigma^2(c, j) + 1}},$$

where $$\sigma^2(c, j) = \frac{1}{m}\left(\sum_{k=1}^{m}[g(c-k, j) - g(c, j)]^2 + \sum_{k=1}^{m}[g(c+k, j) - g(c, j)]^2\right); \text{ and}$$

(iii) interconnecting symmetry point to obtain a symmetry line by computing the least squares fitting on data tuples (j,$C_j$(j)) and associated measurement error value (1−R(j)), wherein R(j) is a reliability measure for each of the symmetry points.

14. Method according to claim 13 wherein a symmetry point for column j or row j, respectively, is obtained by:

(1) calculating for column j or row j, and for each pixel c at position i in column j or row j, symmetrical difference sum values S according to the formula:

$$S(i=c, j) = \sum_{k=1}^{m(i)} [g(c+k, j) - (g(c-k, j)]^2,$$

where c=T, . . . , M−T−1, g(i, j) is a gray value at position (i, j), T is an offset parameter, M is a number of rows or columns, respectively in the matrix, and m(i) equals to min (i, M−i−1), (2) normalizing S to obtain $\overline{S}$, and (3) determining a minimal value $\overline{S}_{min}$ of the values $\overline{S}$ obtained for each pixel c, and denoting a value c for which $\overline{S}$ is equal to $\overline{S}_{min}$ as the symmetry point of column j or row j, respectively.

15. Method according to claim 13 wherein a horizontal symmetry index ($SI_h$) is calculated as $$SI_h = \frac{1}{N} \sum_{j=0}^{N-1} S_h(j),$$

and a vertical symmetry index ($SI_v$) is calculated as $$SI_v = \frac{1}{M} \sum_{j=0}^{M-1} S_v(i),$$

wherein a main orientation index SI of the image is determined as $$SI = \min(SI_h, Si_v),$$

and wherein a symmetry line with an associated symmetry index that is equal to SI determines a direction of orientation of the image.

16. Method according to claim 13 wherein an orientation angle of the image is determined as an angle between a horizontal coordinate axis and a vertical coordinate axis.

* * * * *